May 12, 1964     F. A. LUDWIG     3,132,972
ENERGY CONVERSION CELL

Filed Aug. 4, 1960     2 Sheets-Sheet 1

INVENTOR.
FRANK A. LUDWIG
BY
Miketta and Glenny
ATTORNEYS.

May 12, 1964     F. A. LUDWIG     3,132,972
ENERGY CONVERSION CELL

Filed Aug. 4, 1960

INVENTOR.
FRANK A. LUDWIG
BY
ATTORNEYS.

United States Patent Office

3,132,972
Patented May 12, 1964

3,132,972
ENERGY CONVERSION CELL
Frank A. Ludwig, Altadena, Calif., assignor to Electro-Optical Systems, Inc., Pasadena, Calif., a corporation of California
Filed Aug. 4, 1960, Ser. No. 47,550
11 Claims. (Cl. 136—86)

This invention concerns improvements in the operation and construction of energy conversion cells and more specifically in cells which may be used either as a primary fuel cell or a primary electrolyzer or alternately as a fuel cell and electrolyzer, i.e. a reversible or regenerative fuel cell. Fuel cells are generally power plants that combine fuel with an oxidant and convert the resultant combustion energy directly into electrical energy but they can be used to store electrical energy by using it to generate the fuel and oxidant gases by electrolysis and storing these products.

The present standard method of obtaining electrical energy from combustion energy is to utilize the heat of combustion to generate steam which steam in turn drives a turbine and finally the turbine drives a generator for electrical energy. In such process, the chemical energy associated with the oxidation of a fuel is degraded to heat before it is utilized so that the process is necessarily restricted by the Carnot cycle efficiencies. Fuel cells on the other hand, convert the chemical energy of combustion directly into electrical energy so they are not restricted by the Carnot cycle efficiencies. Because of such direct energy conversion, the presently known fuel cells convert combustion energy to electrical energy with twice the efficiency of the most efficient steam power plants available today. Other advantages of fuel cells which make them attractive are high power both per unit volume and per unit weight, and quietness and cleanliness of operation. For a more detailed discussion of the advantages, construction and operation of fuel cells, one may refer to Industrial and Engineering Chemistry, vol. 52, No. 4, April 1960, at pages 291 to 310.

In spite of these known, outstanding advantages of fuel cells, they have not come into general use because of the many problems associated with their construction and operation. The greatest objection lies in the complex instrumentation and piping which they require and which represent up to fifty percent of their total weight. Such complicated controls tend to be unreliable and to require constant servicing. If a manometer is used then such cells becomes gravity-dependent which prevents its use in missiles and satellites. However, such controls and piping are necessary in such cells to maintain the proper pressure differential across the electrode to prevent flooding of the electrodes and to maintain the balanced gas pressures across the cell, as well as to evaporate and condense the water produced in the cell. In addition, such cells, as set forth above, can only be used to generate electrical energy. If electric current is sent into the cell to produce hydrogen and oxygen, these gases escape through the electrolyte and a large part of the energy to be stored is thereby lost. The expedient of placing a finely porous, non-conducting layer of material between the electrode and electrolyte is complicated, expensive and increases the internal resistance of the cell. In addition, the controls and piping required for the combination of fuel cell and electrolyzer are even more complex and bulky then for the fuel cell alone.

It is necessary in all fuel cells to prevent flooding the electrodes because if more than a thin film of electrolyte solution covers the electrode surface, the fuel gas and oxidizing gas are effectively prevented from reaching the electrode surface and being reacted thereon. Similarly, it is necessary in all fuel cells to balance the gas pressures across the cell to prevent driving the electrolyte solution away from one of the electrodes and breaking the conducting path between the electrodes.

The cell of the present invention accomplishes these functions by internal self-regulation without using external mechanical control devices or manometers and gives high reliability and service-free operation independent of gravity. The cell of the present invention is both efficient and inexpensive and can be used to either generate or store electrical energy or to alternately store and generate electrical energy. Because of its self-regulation without external controls and efficiency, the cell of the present invention is characterized by being light, compact, simple and by having high reliability and a long life. If hydrogen and oxygen are used in the present cell, any need for evaporation, transport and condensation of water is eliminated during a normal cycle of operation of first charging and then discharging unlike the prior art cells. When the cell of the present invention is used in a cyclic operation, it can be completely discharged during the discharge portion of the cycle for many cycles without impairing its operation. This characteristic of course, represents an outstanding advantage over the commonly used lead storage battery in cars and other storage batteries which lose their capacity under such severe operating conditions.

To illustrate some of the advantages of the cell of the present invention, Table I set forth below has been compiled to compare the lightness and compactness of the cell of the present invention with respect to energy storage and production to the presently known cells.

TABLE I[1]

| | Lbs./kwh. | Cu. ft./kwh. |
|---|---|---|
| Ni-Cd Battery | 500–1,000 | 0.8 |
| Cell of the present invention (Gas storage) | 20 | 0.4 |
| Cell of the present invention ($H_2$, $O_2$ storage in solids) | 9 | 0.1 |

[1] Table I calculations are based on performance as a regenerative fuel cell (storage battery) over many one hour cycles. Calculations are independent of power level.

Table I vividly demonstrates how the cell of the present invention is from 25 to 50 times lighter and 2 to 8 times more compact than the presently known cells. Because of such advantages and the other advantages noted above the cell of the present invention has obvious application to missiles and satellites. However, these advantages also make the cell useful for storage batteries in transportation vehicles such as cars and airplanes and particularly in connection with electric motors. In addition, large scale units could be used to store electrical energy during periods of low power loads in electrical power systems and such stored energy could then be used during periods of high power load.

The cell of the present invention comprises two porous, spaced electrodes and a porous, non-conducting bed between said electrodes and in contact with opposing faces of said electrodes, said bed exhibiting a preferential ability to hold electrolyte solution with respect to said electrodes. The cell also has an electrolyte solution in said bed in quantities sufficient to establish conducting paths between electrodes but insufficient to saturate said bed whereby internal capillary forces are present in the bed to maintain electrolyte between said electrodes and storage capacity is present for reactants and products. The cell may also have means supplying solvent vapor to said bed for maintaining a desired range of concentration of electrolyte in the solution within the non-conducting bed.

An object of the invention is a simple, light, compact, efficient internally self-regulating energy conversion cell with long life, high reliability, and internal storage capacity for reactants and products.

Another object of the invention is a regenerative fuel cell with internal self-regulation which maintains the electrolyte solution between its electrodes and prevents flooding without complex controls and piping and without relying on gravity.

Another object of the invention is a regenerative fuel cell with internal self-regulation which compensates for any pressure differences within the cell.

Another object of the invention is a primary fuel cell or a primary electrolyzer with associated facilities which by internal self-regulation maintains the proper electrolyte solution over long periods of time.

Another object of this invention is to disclose and provide materials and methods of construction and arrangement, maintenance of conducting paths through an electrolyte solution, and maintenance of pressure equilibrium and electrolyte concentration whereby self-regulating and high performance characteristics may be obtained.

Still other objects of the invention are methods of operation of energy conversion cells and storage facilities for such cells so that the electrolyte solution is maintained between the cell electrodes and the proper electrolyte solution is maintained over long periods of time.

Other objects and advantages will become readily apparent to those skilled in the art from a description of some exemplary embodiments of the present invention.

Figure 1:
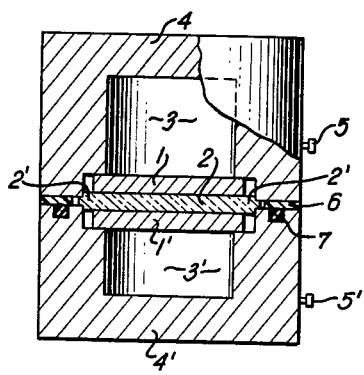
FIG. 1 represents a cross section along the axis of a cylindrical cell actually used to obtain the operating data set forth in one of the examples.

Substantially all energy conversion cells include a pair of electrodes spaced by an electrolyte. When such cell is used as a fuel cell, a fuel gas is supplied to one electrode and an oxidizing gas to the other electrode (hydrogen and oxygen are samples of such gases). When operating as a fuel cell, water is formed and must be removed; excessive dilution of the electrolyte is undesirable. When used as an electrolysis cell, large volumes of hydrogen and oxygen are formed from the water of the electrolyte, and since the volumes of gases generated differ, different pressure zones are formed and such pressure differentials are not desirable, for reasons set forth above. Also, water must be supplied to replenish the electrolyte solution. The complicated and heavy instrumentation of the prior art directed to the amelioration of these problems has been eliminated by the present invention.

The present invention discloses a method of maintaining between electrodes an effective amount of electrolyte without having such electrolyte undesirably expelled or displaced from between the electrodes or flooding the electrodes by gas at a higher pressure adjacent one electrode than the pressure of gas adjacent the other electrode. Moreover, this objective is attained without recourse to pumps and external mechanisms. The cell is self-contained and self-regulating. This desirable objective is attained, in accordance with this invention, by providing a porous, non-conducting bed between the electrodes and charging such bed with electrolyte in quantities insufficient to saturate the bed but sufficient to provide conducting paths through the bed between the electrodes and yet provide storage capacity for reactants and products. Moreover, pursuant to this invention, the porous bed is of such porosity and character that capillary forces are made available to hold the electrolyte within the bed preferentially, thereby retarding the movement of electrolyte into the electrodes.

Moreover, pursuant to a preferred form of this invention, the porous, non-conducting bed is caused to extend beyond the opposing faces of the electrodes, such extended portions of the bed performing several new and important functions. These extensions of the bed (from between the electrodes) may act as structural spacers or partitions separating chambers in communication with the electrodes. Pressure differentials between such chambers are automatically virtually equalized because the extensions of the bed are permeable to gases and such mixing as does occur by diffusion does not prevent high operating efficiency. Such extended portions of the bed permit minimizing the internal resistance of the cell and also act as reservoirs for excessive electrolyte or solvent (such as water) which may be formed or which may be needed, without flooding the electrodes or permitting the effective concentration of electrolyte to depart from a desired range. In one form of this invention, the extensions of the bed may be used as storage for fuel and oxidizing gas.

The present invention also provides a simple and effective method and means for maintaining the concentration of electrolyte solution in a porous, non-conducting bed within a desired range for long time periods when operating either as a primary fuel cell or electrolyzer. This objective is automatically attained without the use of cumbersome and heavy apparatus, by providing an absorptive storage means for the solvent and automatically discharging (or absorbing) solvent from (or to) such storage means to (or from) the porous, non-conducting bed in accordance with the partial vapor pressure of the solvent in the atmosphere ambient the electrodes and the porous non-conducting bed.

These and various other novel features of the present invention and various modifications thereof will be described hereafter. Several simple forms of this invention are somewhat diagrammatically illustrated in the drawings.

An embodiment of a simple efficient cell containing pressure-equalized chambers is shown in FIG. 1. In FIG. 1, a pair of porous conducting electrodes 1 and 1' are separated by a porous non-conducting bed 2 with an extension therebeyond 2'. Bed 2 contains a body of electrolyte solution in quantity insufficient to saturate said bed but sufficient to establish conducting paths between the electrodes and yet provide storage capacity for reactants and products. Chamber 3 is in communication with the outer side of electrode 1 and chamber 3' is in communication with the outer side of electrode 1'. The pressures in chamber 3 and 3' are equalized mainly by passage of gas through the extension 2' and through a small portion of the electrode at its outer side although some gas passes directly through the electrodes 1 and 1' and bed 2.

The electrodes 1 and 1' and non-conducting bed 2 are substantially enclosed in a gas-tight housing composed of conductive housing portions 4 and 4' clamped together (means not shown) but separated by a suitable dielectric such as a Teflon gasket 6 and a Teflon (polytetrafluoroethylene) O-ring 7. Housing portions 4 and 4' have electric terminals 5 and 5' respectively for conducting wires (not shown) to the cell.

Figure 2:
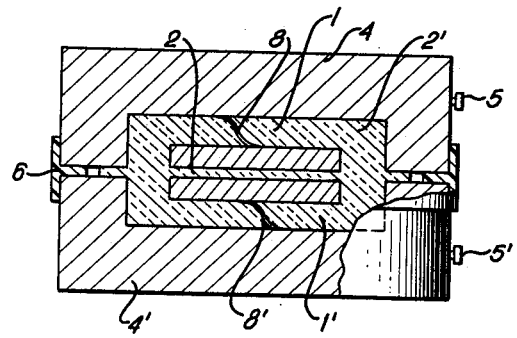
FIG. 2 represents a cross section along the axis of another cylindrical cell actually used to obtain the operating data set forth in one of the examples.

Another light, compact form utilizing the non-conducting bed for gas storage and permitting free mixing of the gases within the cell is shown in FIG. 2. In FIG. 2, a pair of porous, conducting electrodes 1 and 1' are separated by a porous non-conducting bed 2 with an extension 2' which virtually encloses said electrodes. Bed 2 contains a body of electrolyte solution in quantity insufficient to saturate said bed but sufficient to establish conducting paths between the electrodes and permit gas storage as well as liquid storage within said bed. The electrodes 1 and 1' and non-conducting bed 2 are substantially enclosed in a gas-tight housing composed of housing portions 4 and 4' clamped together (means not shown) but separated by insulating gasket 6. Housing portions 4 and 4' have electrical leads 8 and 8' respectively for contacting electrodes 1 and 1' respectively and electrical terminals 5 and 5' respectively for connecting conducting wires (not shown) to the cell.

Figure 3:
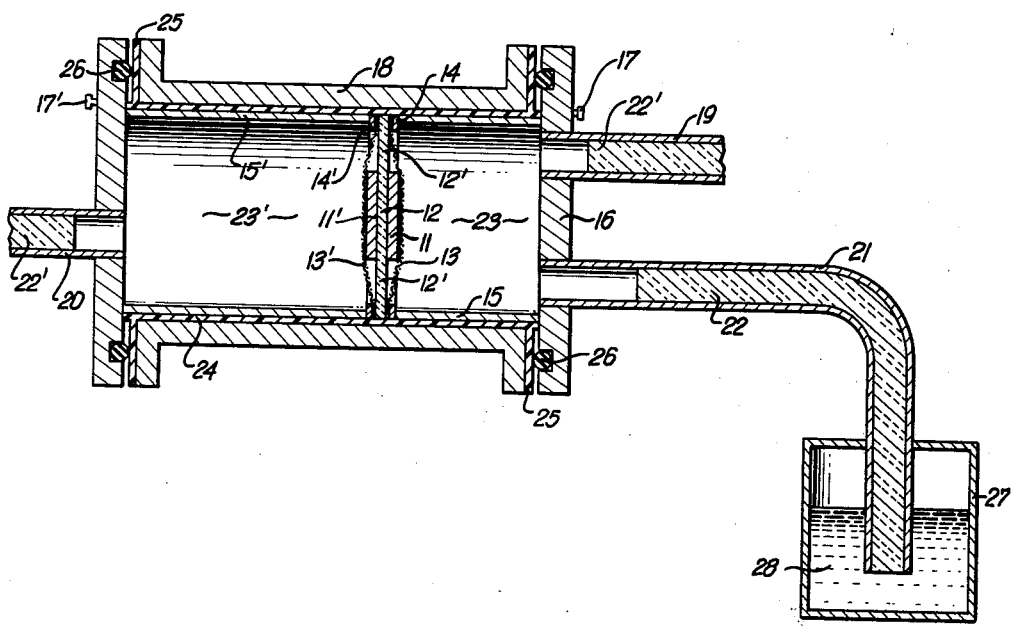
FIG. 3 represents a cross section along the axis of still another cylindrical cell actually used to obtain the operating data set forth in one of the examples and shows its associated electrolyte solvent storage facility and sources of fuel gas and oxidizing gas.
Figure 4:
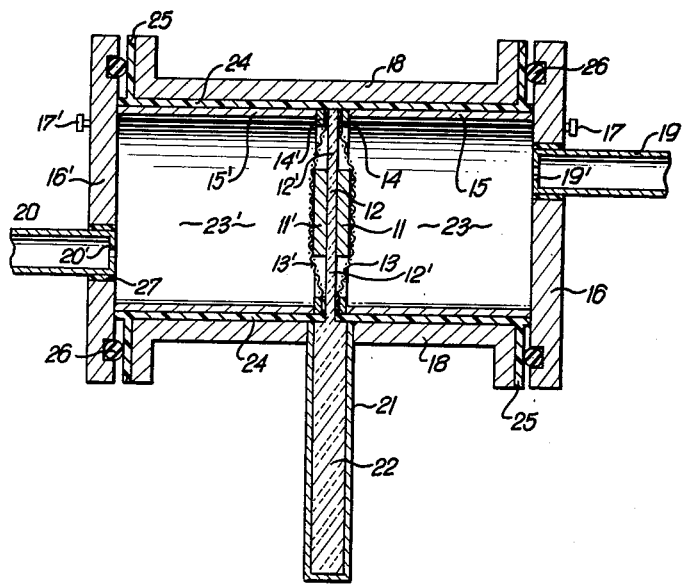
FIG. 4 represents a cross section along the axis of another cylindrical cell which is a possible variation of the cell in FIG. 3.

Still other embodiments of the present cell including outside sources of fuel and oxidizing gas and means for maintaining the concentration of the electrolyte in solution for long time periods are shown in FIGS. 3 and 4. In FIGS. 3 and 4 a pair of porous, conducting electrodes 11 and 11' are separated by a porous non-conducting bed 12 with an extension therebeyond 12'. Bed 12 contains a body of electrolyte solution in quantity insufficient to saturate said bed but sufficient to establish conducting paths between the electrodes and yet provide storage capacity for reactants and products. The electrodes 11 and 11' and non-conducting bed 12 are substantially enclosed in a gas-tight housing composed of housing 18 and covers 16 and 16' connected together (means not shown) but separated by insulating gaskets 25 and O-rings 26. The housing 18 is insulated from the rest of the cell by insulating sleeve 24. Chamber 23 is in communication with the outer side of electrode 11 and chamber 23' is in communication with the outer side of electrode 11' but said chambers are separated by the extended portions 12' of said non-conducting bed. Electrodes 11 and 11' respectively are electrically connected to terminals 17 and 17' respectively by means of conducting screens 13 and 13' respectively, conducting washers 14 and 14' respectively, conducting tubes 15 and 15' respectively and conducting covers 16 and 16' respectively. Conduits 19 and 20 are used to add or remove gas from chambers 23 and 23' respectively and may contain plugs of porous material 22' as in FIG. 3 or merely orifices 19' and 20', as in FIG. 4. The conduits 19 and 20 and 21 may be electrically insulated from covers 16 and 16' by insulating gaskets 27, as in FIG. 4. A solvent-containing storage bed 22 in conduit 21 is a means for supplying solvent vapor to the non-conducting bed 12 in accordance with the variation of solvent vapor pressure within the cell and thus maintaining the concentration of electrolyte in solution in the non-conducting bed for long time periods. One portion of storage bed 22 is in proximity to said non-conducting bed 12 and another portion of storage bed 22 is in a zone of lower temperature than electrodes 11 and 11' and non-conducting bed 12. In FIG. 3, storage bed 22 is separated from non-conducting bed 12 and contacts a pool of solvent 28 in a vessel 27. In FIG. 4, storage bed 22 simply contacts non-conducting bed 12.

Figure 5:
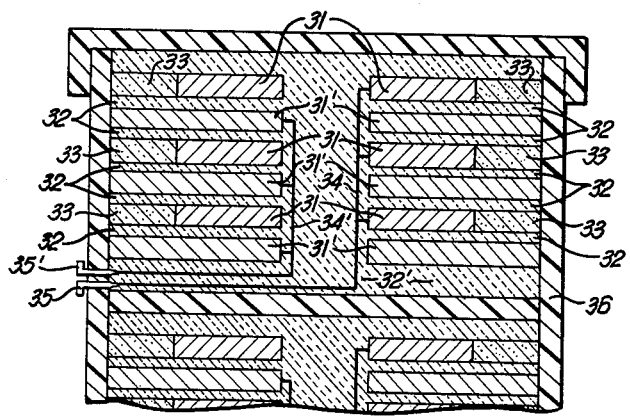
FIG. 5 represents a portion of a simplified schematic cross section along the axis of another cylindrical cell.

Still another form of the present, very compact, self-contained, completely enclosed, high output cells is illustrated in FIG. 5. In FIG. 5, each pair of annular, porous conducting electrodes 31 and 31' are separated by a porous, non-conducting bed 32 with an extension 32' which passes through and partially encloses said electrodes. Bed 32 contains a body of electrolyte solution in quantity insufficient to saturate said bed but sufficient to establish conducting paths between the electrodes and yet provide storage capacity for reactants and products. Surrounding each electrode 31 is an annular body 33 adapted to releasably store the gas produced at electrode 31. Consequently, during electrolysis of for example, an aqueous solution, a body 33 of calcium oxide, will store oxygen and subsequently during operation as a fuel cell will release the stored oxygen. In each cell in FIG. 5 the electrodes 31 are connected in parallel by insulated wire 34 to terminal 35. Similarly, the electrodes 31' are connected in parallel by insulated wire 34' to terminal 35'. Completely enclosing each cell is a dielectric housing 36 through which terminals 35 and 35' pass so the cells may be arranged either in parallel or in series.

It should be noted that electrolyte solution contained in the non-conducting bed in FIGS. 1–5 has not been directly shown in the figures. The reason is that the interface between the electrolyte solution and the gas is usually quite an irregular pattern throughout the bed and can shift in position depending upon variables such as changing gas pressures on either side of the bed. The actual position and pattern of the electrolyte solution within the non-conducting bed is immaterial so long as the specified functions of the porous bed and electrolyte solution are performed.

The operation of the energy conversion cell of the present invention is internally self-regulating and does not require external mechanical control devices or manometers to control the pressure drop across the electrode or pressure differential between the oxidizing and fuel gases. The method of operation comprises first constituting a non-conducting bed of a porous material having a preferential ability to hold electrolyte with respect to said electrodes. The non-conducting bed is preferably formed so that it extends beyond the opposing surfaces of the electrodes with which it is in contact and is exposed to the effect of gases ambient said electrodes. Then the bed is charged with electrolyte in quantity insufficient to saturate it but sufficient to establish conducting paths between the electrodes and yet provide storage capacity for reactants and products.

Two basic features of this invention are the preferential ability of the non-conducting bed to hold electrolyte with respect to the electrodes and to store reactants and products. The first feature can be obtained by setting up capillary forces within the non-conducting bed which preferentially hold the electrolyte in the bed with respect to the electrodes. The preferred way of setting up such capillary forces is to first form a porous non-conducting bed having at least a substantial portion of pores finer than the pores of the electrodes. Hence a portion of the non-conducting bed pores may be larger than the electrode pores if certain effects such as promoting passage of gas throughout the non-conducting bed are desired. However, in general, it is preferred that the non-conducting bed to be finely porous and the electrodes be coarsely porous. The relative terms "finely porous" and "coarsely porous" are sufficient to describe this feature of the present invention since the absolute pore size is not important. For example, the pore sizes may both be varied and the ratio between them varied as long as a substantial portion of the pores of the electrode remains larger than the pores of the non-conducting bed. It should be noted that the resulting capillary forces in any porous material for any given liquid depend not only on pore size but also upon the wettability of the surface. Hence the relative pore sizes in the non-conducting bed and the electrodes can be varied depending on the wettability of the surface of the non-conducting bed and the electrodes. For example, the surface of the electrode may be treated to decrease its wettability so that the overall effective pore size ratio of the non-conducting bed to the electrode may be increased. However, it is simpler and more inexpensive to rely on a generally finer pore size in the non-conducting bed since the materials commonly used in cell construction do not differ significantly in their surface wettability in the absence of special treatment.

After forming a porous non-conducting bed having at least a substantial portion of pores finer than the pores of the electrodes, it is then necessary to charge such bed with an electrolyte solution in a quantity insufficient to saturate such bed. Such partial saturation of the finely porous non-conducting bed permits the bed to have a preferential ability to hold the electrolyte solution with respect to the coarsely porous electrodes with which it is in contact and to store cell reactants and products. An explanation for this holding phenomenon is that when the bed is partially saturated, the pores within the bed effectively have gas-liquid interfaces at each end so that the capillary forces at each end dynamically balance each other to form an equilibrium condition. Consequently there is no tendency to flood the electrodes and such partial saturation performs the same function as the complex instrumentation in the prior art cells. Such explanation would also account for the need in the prior art cells to maintain a pressure difference across the electrode to prevent flooding of the electrode. In the prior art cells, one side of the finely porous layer of the electrodes is immersed in an electrolyte solution so that the sole gas-liquid interface in the pores forms unbalanced capillary forces which tend to move the electrolyte solution into the electrode. There is also an explanation for the storage phenomenon of the partially saturated bed. When operated as a fuel cell the generally finer porosity of the non-conducting bed insures that all liquid produced by the cell is taken up by the bed because such finer porosity causes resulting stronger capillary forces in the bed which prevail over the weaker capillary forces in the coarser porosity electrodes. Such liquid after absorption by the non-conducting bed will tend to mix and distribute uniformly throughout the non-conducting bed for two reasons. First, as additional pure solvent for the electrolyte, the electrolyte will tend to diffuse into it. Second, as additional pure solvent for the electrolyte, its vapor pressure will be higher than the surrounding electrolyte solution so it will tend to vaporize and condense in the surrounding electrolyte solution. Under such operation the only limitations are the saturation point of the non-conducting bed and excessive dilution of the electrolyte. Conversely, when operated as an electrolysis cell, all the electrolyte solution stored in the bed is available for use since as solvent is removed from the portion of the non-conducting bed adjacent the electrodes, it is replaced by the solvent from other portions of the bed by the same mechanisms of diffusion and vapor transport. During electrolysis the only limitations are the complete drying out of the non-conducting bed and excessive concentration of the electrolyte.

In any event, irrespective of the explanation for the phenomenon, it has been found that by using the non-conducting bed of the present invention with an overall effective pore size finer than the contacting electrodes and with partial saturation, no flooding of the electrodes occurs but unusually efficient operation is obtained. Also, the liquid produced by operation as a fuel cell is taken up by the non-conducting bed, which eliminates the need for complex bulky additional apparatus such as used in the prior art cells and which renders the cell of the present invention gravity-independent. Finally, substantially all the electrolyte solution taken up by the non-conducting bed remains available for use during operation as an electrolysis cell.

Another important feature of the present invention is the extension of the partially saturated, finely porous, non-conducting bed beyond the opposing surfaces of the coarsely porous electrodes. Such extension permits first efficient operation by allowing the electrodes to come into close proximity and thus minimize internal cell resistance. Second, such extension permits the maximum liquid storage capacity in the non-conducting bed while maintaining the condition of partial saturation. Finally, as already noted, such extension permits the non-conducting bed to be used, if desired, as a barrier separating the chambers adjacent the electrodes. This last advantage is particularly important since it not only permits storage of different gases in such chambers but also promotes automatic adjustment of pressure differences between such chambers by diffusion of gas through the partially saturated barrier and displacement of liquid within the barrier. Of course, such adjustment of pressure also takes place by diffusion of gas through the partially saturated non-conducting bed between the electrodes but it is promoted by the bed extensions because the resistance of the electrodes is eliminated. It should be noted that the prior art cells requires much complex instrumentation to obtain such pressure control. However, for particular requirements, an unsaturated porous bed not extending beyond the electrodes would be satisfactory.

Another important feature of the present invention is a storage bed of porous material for additional solvent for the electrolyte solution. One portion of said bed is in proximity to the non-conducting bed and another portion of said storage bed is in a zone of lower temperature than the electrodes and non-conducting bed. Such bed may actually contact the non-conducting bed, as in FIG. 4, but it is preferred that it be separated therefrom, as shown in FIG. 3. There are two reasons for preferring separation of the storage bed from the non-conducting bed. One is simply that such separation prevents the loss of electrolyte from vicinity of the electrodes by diffusion into the storage bed. The other is that such separation also prevents solvent flow into the non-conducting bed by capillary forces alone when the storage bed contacts a body of solvent in the zone of lower temperature, as in FIG. 3. The explanation for the operation of said storage bed is based on the variations in partial pressure of the solvent vapor in the gases ambient said electrodes and the non-conducting bed and the temperature gradient within the storage bed. First, it must be noted that the storage bed acts as a porous plug and thereby allows pressure differences of vapor to exist along its length. Under equilibrium conditions the partial pressure of the solvent in the electrolyte solution at the cell temperature is balanced by the vapor pressure in the storage bed at the solvent liquid-gas interface which is located at a point in the bed which is intermediate in temperature between the cell temperature and the zone of lower temperature. If the cell of the present invention is operated as an electrolysis cell, the solvent in the electrolyte solution will be consumed to produce oxidizing gas and fuel gas. Consequently, the partial pressure of the solvent in the electrolyte solution will be decreased by the increased concentration of electrolyte.

The drop in the partial pressure of solvent vapor in the gases ambient the electrodes and non-conducting bed causes solvent vapor to move from the storage bed and to condense in the non-conducting bed until an equilibrium condition is re-established both by the increase of partial pressure of solvent in the electrolyte solution and decrease in vapor pressure in the storage bed by movement of the liquid-gas interface toward the zone of lower temperature. Conversely, operation of the cell of the present invention as a fuel cell causes movement of solvent vapor from the non-conducting bed to the storage bed by a reversal of the above-described chain of events. Of course, if the cell of the present invention is operated as a primary fuel cell, the storage bed may be initially dry to permit maximum storage of solvent. Likewise for primary electrolysis cell operation, the storage bed may be initially saturated. For maximum capacity in the storage bed, it is preferred that the portion in the zone of lower temperature contact a body of solvent for the electrolyte, as shown in FIG. 3. In such situation, the capillary forces in the storage bed will move the solvent from the body of solvent to said liquid-gas interface within the storage bed. It should be noted that porous plugs 22' in FIG. 3 primarily serve to inhibit loss of solvent vapor from the cell although they may be used as storage beds.

Still another important feature of the cell of the present invention is the releasable storage within the cell of the fuel gas and oxidizing gas either by the electrode or by a body in proximity to the electrode. This feature is best illustrated when the cell of the present invention is operated by using oxygen as the oxidizing gas and hydrogen as the fuel gas. For example, when the cell shown in FIG. 2 is operated as an electrolysis cell with a nickel cathode, the hydrogen formed at the cathode is strongly adsorbed in large quantity by the cathode. Under similar conditions, using the cell in FIG. 5, a body 33 of calcium oxide adjacent the anode 31 will store oxygen by formation of a peroxide compound. In both cases, reversing the cell and operating it as a fuel cell will cause the hydrogen and oxygen to be released due to the lowering of their partial pressures and ultimately to recombine electrochemically.

Finally, it should be noted that in cell shown in FIG. 2 there is no separation between the fuel gas such as hydrogen and oxidizing gas such as oxygen. As long as the operating temperature of the cell is sufficiently low and the non-conducting bed is virtually free of catalytic agents conducive to the direct formation of water from hydrogen and oxygen it has been found that the efficiency of the cell is not impaired. This surprising result of permitting intermixing between the fuel gas and oxidizing gas and maintaining the operating efficiency of the cell is, of course, directly contrary to the teachings of the prior art. One explanation of this phenomenon is that the adsorption of hydrogen on nickel is partly irreversible and thereby the recombination of $H_2$ and $O_2$ is retarded when the $H_2$ is actually stored within the nickel. Another explanation of this phenomenon is that one electrode has a lower overvoltage for oxidizing gas, i.e., preferentially reacts with oxidizing gas and the other electrode has a lower overvoltage for fuel gas. Such would appear to be the situation for hydrogen and oxygen with a nickel electrode and a lithiated nickel oxide electrode respectively. However, irrespective of such explanations another feature of the present invention is permitting the oxidizing gas and fuel gas to intermix and still obtain high operating efficiencies.

When the energy conversion cell of the present invention is used as a regenerative fuel cell, the only restriction with respect to the fuel gas and oxidizing gas is that the electrolysis portion of the cycle must regenerate the fuel gas and oxidizing gas. Consequently a non-aqueous solvent may be preferred for certain systems. When the present cell is used as a primary fuel cell or as a primary electrolysis cell the only restriction is that the reaction products can be removed from the non-conducting bed either directly as gases or by vaporization of the liquid. The only restriction on the electrolyte-solvent combination is that it must have the proper surface and interfacial tension characteristics with respect to the electrode and non-conducting bed materials. With these limitations stated, it is possible to set forth various materials which can be used in the cell of the present invention in one or more of its modes of operation. For fuel gas, hydrogen is preferred, but carbon monoxide, methane, ethane, methanol, natural gas and in general the lower hydrocarbons and their partial oxidation products may be used. For oxidizing gas, oxygen is preferred but air and any of the halogens such as chlorine or bromine may be used. The electrolyte solution which is preferred is an aqueous solution of potassium hydroxide because of its high conductivity without corrosion of certain metals; however, aqueous solutions of any water-soluble acid, base or salt, or a mixture of one or more of them, may be used, such as sulfuric acid and hydrochloric acid, sodium hydroxide and sodium carbonate, or sodium chloride and sea water. Also, non-aqueous solutions of electrolytes may be used. The porous, conducting electrodes which may be used in the present invention may be constructed of the same materials and in the same fashion as now employed in the fuel cell art. Note the Bacon Patent 2,928,783, issued March 15, 1960. For example, sintered nickel or a treated form of it may be used but other materials such as silver, platinum or carbon treated with silver oxide and cobalt oxide or carbon treated with palladium or platinum may also be used so long as the requirements of being conducting and generally coarsely porous are met. Similarly, finely porous, non-conducting beds may be constructed preferably of asbestos but other materials such as aluminum oxide, green nickel oxide or magnesium oxide may be used so long as the requirements of being generally finely porous and non-conducting are met. The non-conducting bed may be bonded to the electrodes or merely press-fitted against them. The storage bed may be made of the same materials used for the non-conducting bed or electrodes. The materials used to store the oxidizing gas such as oxygen may be lead oxide or calcium oxide or any other compound capable of reversibly combining with the oxidizing gas, depending on the pressure. Similarly for the fuel gas such as hydrogen, materials such as palladium, platinum, nickel and iron may be used so long as it combines the fuel gas at high pressure and releases the fuel gas at low pressure.

Several cells of the present invention have been constructed and operating data obtained from them. The following examples give the details of construction and operation of such cells.

*Example I*

A cell as shown in FIG. 1 was constructed. The housing 4 and 4' had an overall length of 2¼ in. and a diameter of 2 in. and was made of stainless steel. The gasket 6 and O-ring 7 were made of Teflon. The chambers 3 and 3' were approximately ⅞ in. in diameter and lengths to the outer side of the electrode were approximately 1 in. and ½ in. respectively. The electrodes 1 and 1' were 15/16 in. in diameter and ⅛ in. thick with a pore size of about 30 microns. The electrodes were made of sintered nickel and of sintered nickel treated with lithium-containing nickel oxide, as described in the Bacon Patent 2,928,783. The non-conducting bed 2 and 2' was made of three stacked asbestos discs each 0.04 in. thick and effectively approximately 1¼ in. in diameter with a pore size of about 1 micron. The center asbestos disc was clamped between the two housing halves 4 and 4'. The non-conducting bed was partially saturated with a 35% by weight aqueous KOH solution. The operating temperature was about 165° C. With this cell under these conditions the following data were obtained during cyclic operation, i.e., operation as an electrolysis cell followed by operation as a fuel cell using $H_2$ and $O_2$:

|  | Current (ma./cm.²) | Voltage (v.) |
|---|---|---|
| Cell on Charge (Current In) | 300 | [1] 1.00 |
| Cell on Discharge (Current Out) | 106 | 0.55 |
|  | 158 | 0.35 |

[1] This figure is lower than the theoretical voltage for the electrolysis of water. It was obtained probably due to the fact that the activity ratio of products to reactants in the Nernst equation is less than unity.

It should be noted that the presently known fuel cells operating under the above conditions give on discharge only about 20–30 ma./cm² at 0.45 volt.

*Example II*

A cell as shown in FIG. 2 was constructed. The stainless steel housing 4 and 4' had an overall length of about 1 in. and a diameter of 2 in. The gasket 6 was made of Teflon. The electrodes were approximately the same dimensions and were constructed of the same materials as used in Example I. The electrodes 1 and 1' were separated by 1/32 in. and contacted the housing 4 and 4' by nickel strips 8 and 8'. The non-conducting bed 2 and 2' used the same material as in Example I but its dimensions were 1¼ in. diameter by ½ in. thick less the space occupied by the electrodes. The non-conducting bed was partially saturated with a 35% by weight aqueous KOH solution and the cell operated at 155° C. for one hundred and nineteen 8-minute cycles (4-minute charge followed by 4-minute discharge). The following data were obtained:

|  | Cycle No. | Charge (Average) | Discharge (Average) | Efficiency (Percent) |
|---|---|---|---|---|
| Average Voltage (Volts) | 72 | 0.84 | 0.45 | 54 |
|  | 77 | 0.87 | 0.40 | 46 |
|  | 119 | 0.91 | 0.31 | 34 |
| Average Current (Amps/in.²) | 72 | 0.76 | 0.76 | 100 |
|  | 77 | 0.71 | 0.71 | 100 |
|  | 119 | 0.68 | 0.62 | 91 |

It should be noted that in both Example I and Example II the reactions involved were the electrolysis of the hydroxide solution to give hydrogen and oxygen and the combination of hydrogen and oxygen to give water. The possibility of a $Ni \rightarrow Ni^{++}$ reaction was eliminated by checking for gaseous products. The very high current efficiency is proof of the electrochemical recombination of $H_2$ and $O_2$ rather than a catalyzed non-electrical combination of $H_2$ and $O_2$.

*Example III*

A cell as shown in FIG. 3 was constructed. The nickel housing 18 was 2½ in. IPS pipe 2 in. long with soldered-on nickel end flanges 4 in. in diameter. The covers 16 and 16' were nickel and 4 in. in diameter by ½ in. thick. Insulating gaskets 25 and O-rings 26 were made of Teflon. The insulating Teflon sleeve 24 was 0.047 in. thick and covered the entire inner surface of the cell housing. The conducting tubes 15 and 15' were made of 2 in. IPS nickel pipe and provided electrical contact between the electrode assembly and covers 16 and 16' with terminals 17 and 17' respectively. The conducting washers 14 and 14' were nickel and 1/16 in. thick. The conducting screens 13 and 13' were 20 x 20 mesh and made of Monel and provided electrical contact through the conducting washers between the electrodes and conducting tubes. Conduit 19 was a 14 in. long nickel tube ½ in. outside diameter with 0.065 in. wall thickness and served as the hydrogen inlet. Conduit 20 was identical to conduit 19 except it served as the oxygen inlet. Conduit 21 was also identical to conduit 19 except it was 12 in. long and connected to a pressure gauge (not shown). Conduits 19, 20 and 21 were all air-cooled so they were at a temperature of about 30° C. at their far ends. The plugs 22' and storage bed 22 were all made of alkali-resistant filter paper saturated with water and all came within 1 in. of the hot end of the conduits and extended all the way to the cool end of the conduits. The electrodes 11 and 11' were approximately the same dimensions and were constructed of the same materials as used in Example I with the treated electrode being 11' and the untreated being 11. The non-conducting bed 12 and 12' was again made of asbestos of about 1-micron pore size and had a thickness of about 1/16 in. The non-conducting bed was partially saturated with 35% by weight aqueous KOH solution. The operating temperature was about 165° C. and operating pressure was 330–350 p.s.i. With this cell under these conditions the following data were obtained:

| Operation | Current (ma./cm.²) | Voltage (v.) |
|---|---|---|
| Primary Fuel Cell (Charging $O_2$ and $H_2$) | 46 | 0.50 |
| Primary Electrolyzer (Charging current) | 300 | 1.0 |

It should be noted that the operating temperature in all three examples could be obtained by insulating the cells and permitting the cells' own inefficiency, i.e., direct exothermic combination of $H_2$ and $O_2$ to heat the cells. In large installations it may be necessary to actually cool the cell to maintain the desired operating temperature.

The operating temperature may range from 20° C. up to 250° C. and the operating pressure may range from slightly above atmospheric to above 1000 p.s.i. Likewise, the concentration of the electrolyte may range from 10% to 50%.

The non-conducting bed may contain a conducting material such as particles of metal or a metal screen to decrease the internal resistance of the bed so long as the bed overall remains non-conducting. Both the electrodes and the non-conducting bed may vary from uniform pore size. For example, the use of larger pore sizes in portions of the non-conducting bed will promote the passage of vapors such as water vapor in the bed and permit faster attainment of equilibrium conditions. Also, if the surface tension of the electrolyte were to decrease with the increasing temperature, then the pore size of the electrodes and the non-conducting bed may increase toward their edges. Also, as shown in FIG. 5, more than a single pair of electrodes may be used in the present invention. The conduits to the cell used to charge or remove gases when the cell is used as a primary fuel cell or a primary electrolyzer may be unobstructed or may contain porous plugs or simply orifices. When the cell is used as a primary fuel cell and water vapor is produced, it may be used to react with a metal hydride such as a lithium hydride to obtain more hydrogen fuel gas.

The foregoing description and examples are only intended to set forth generally the contents of the present invention and are not limitations as to its scope. All alterations and variations which are obvious to one skilled in the art come within the scope of the invention as set forth in the following claims.

I claim:

1. An efficient, compact, internally self-regulating energy conversion cell comprising: a gas tight housing enclosing by its inner wall a pair of porous electrodes; a non-conducting porous bed between and in contact with said electrodes and extending to said inner wall, and an electrolyte, said bed having a substantial portion of pores finer than the pores of said electrodes and thus having a preferential ability to hold the electrolyte solution in said bed, said electrolyte being in a quantity sufficient to establish conducting paths between electrodes but insufficient to saturate said bed thereby providing storage capacity for the cell reactants and products therein while preventing flooding of the electrodes and allowing pressure equilibrium by gas passage through the bed.

2. An energy conversion cell as described in claim 1 wherein additional means are provided for supplying solvent vapor to said bed in accordance with variations in partial pressure of such solvent vapor in gases ambient said electrodes and bed.

3. An energy conversion cell as described in claim 2 wherein the means for supplying solvent vapor to said bed includes a storage bed of porous material carrying solvent, one portion of said bed being in proximity to said non-conducting bed and another portion of said storage bed being substantially spaced therefrom and means to maintain said portion of said storage bed so spaced at a lower temperature than said electrodes and non-conducting bed.

4. An energy conversion cell as described in claim 1, wherein the sides of said electrodes remote from said non-conducting porous bed are in communication with chambers containing a body of fuel gas and a body of oxidizing gas, respectively.

5. An energy conversion cell as described in claim 1, wherein the outward side of one electrode is in communication with a separate body adjacent said electrodes adapted to releasably store an oxidizing gas.

6. An energy conversion cell as described in claim 5 wherein thhe outward side of the other electrode is in communication with a separate body adjacent said electrodes adapted to releasably store a fuel gas.

7. An energy conversion cell as described in claim 1, wherein portions of said non-conducting bed extend beyond the opposing faces of said electrodes and are permeable to gas, whereby fluid pressures on opposite sides of said electrodes tend to be equalized without deleterious loss of electrolyte from between said electrodes by diffusion of fluid through said extended bed portions, said electrolyte being capable of limited movement in said bed in response to fluid pressures.

8. An energy conversion cell as described in claim 1, wherein the non-conducting bed virtually completely encloses said electrodes and the cell reactants and products can circulate throughout said non-conducting bed.

9. An energy conversion cell as described in claim 1, wherein said non-conducting bed between said electrodes contains a particulate solid conducting material adapted to decrease the internal resistance of said bed without providing a continuous conducting path through the bed.

10. In an energy conversion cell, the combination of: a porous electrode having a selective absorption for hydrogen; a second porous electrode in spaced relation to the first electrode; a non-conducting, porous bed between and in contact with said electrodes and extending therebeyond, said bed being virtaully free of catalytic agents conducive to the formation of water from hydrogen and oxygen and having a substantial portion of pores finer than the pores of said electrodes, portions of said non-conducting bed removed from between said electrodes being permeable to gas, and an electrolyte solution in said bed in quantities sufficient to establish conducting paths between the electrodes but insufficient to saturate said bed, whereby fluid pressures on opposite sides of said electrodes tend to be equalized without deleterious loss of aqueous electrolyte solution from between said electrodes storage capacity for the cell reactants and products is provided and oxygen produced by the operation of said cell can circulate throughout said cell and contact said hydrogen electrode.

11. An energy conversion cell as stated in claim 10, wherein said electrodes and non-conducting bed are substantially enclosed in a gas-tight housing.

References Cited in the file of this patent

UNITED STATES PATENTS

| | | |
|---|---|---|
| 409,365 | Mond et al. | Aug. 20, 1889 |
| 541,081 | Edgerton | June 18, 1895 |
| 1,667,435 | Oppenheimer | Apr. 24, 1928 |
| 1,677,032 | Kaffer | July 10, 1928 |
| 1,717,244 | Oppenheimer | June 11, 1929 |
| 2,070,612 | Niederreither | Feb. 16, 1937 |
| 2,646,455 | Jeannin | July 21, 1953 |
| 2,913,511 | Grubb | Nov. 17, 1959 |
| 2,928,888 | Vogt | Mar. 15, 1960 |
| 3,022,244 | LeBlanc | Feb. 20, 1962 |

FOREIGN PATENTS

| | | |
|---|---|---|
| 315,209 | Great Britain | 1930 |